US012391063B1

(12) United States Patent
Goodman

(10) Patent No.: US 12,391,063 B1
(45) Date of Patent: Aug. 19, 2025

(54) PAINTING TOOL ORGANIZATION

(71) Applicant: Painting Productline Innovations, Denver, CO (US)

(72) Inventor: Marty Goodman, Boulder, CO (US)

(73) Assignee: Pinnacle Pro, Inc., Lafayette, CO (US)

(*) Notice: Subject to any disclaimer, the term of this patent is extended or adjusted under 35 U.S.C. 154(b) by 0 days.

(21) Appl. No.: 18/759,145

(22) Filed: Jun. 28, 2024

(51) Int. Cl.
*B44D 3/12* (2006.01)
*B44D 3/14* (2006.01)

(52) U.S. Cl.
CPC ............... *B44D 3/126* (2013.01); *B44D 3/14* (2013.01)

(58) Field of Classification Search
CPC .......... B44D 3/126; B44D 3/14; B44D 3/121; B44D 3/123; B44D 3/125
USPC ................................. 220/570, 697, 735, 736
See application file for complete search history.

(56) References Cited

U.S. PATENT DOCUMENTS 604,549 A * 5/1898 Spencer ................. B44D 3/123 248/210
1,451,984 A * 4/1923 Jordan ................... B27G 11/02 206/229
3,409,931 A * 11/1968 Graf ....................... B44D 3/126 15/257.06
5,236,161 A * 8/1993 Haven ....................... E06C 7/14 220/570
6,446,829 B1 * 9/2002 Malvasio ............... B44D 3/123 220/736
6,493,901 B1 * 12/2002 Jones ....................... B44D 3/12 220/570
7,377,004 B2 * 5/2008 LeCompte ............. A47L 13/58 220/571.1
9,713,374 B1 7/2017 Page
2009/0045201 A1 * 2/2009 Cheng .................... A47B 55/02 220/494

FOREIGN PATENT DOCUMENTS

EP 2251210 A1 * 11/2010 ............. B44D 3/123
FR 3050398 A1 * 10/2017
FR 3124435 A1 * 12/2022 ............. B44D 3/123

* cited by examiner

*Primary Examiner* — Orlando E Aviles
*Assistant Examiner* — Niki M Eloshway
(74) *Attorney, Agent, or Firm* — MP Patents, LLC

(57) ABSTRACT

An organizer for paint applicators includes a tray and a first set of one or more tabs. The tray has interior and exterior surfaces extending between first and second ends and forming a lower trough exhibiting a lower curve and having a lower edge, an upper trough exhibiting an upper curve and having an upper edge and a ridge exhibiting an intermediate curve and joining the lower and upper troughs. The first set of one or more tabs extend from the upper edge of the upper trough in a first direction and exhibit first, second and third curves.

10 Claims, 7 Drawing Sheets

PAINTING TOOL ORGANIZATION

SUMMARY

The disclosure describes an organizer for paint applicators. The organizer includes a tray and a first set of one or more tabs. The tray has interior and exterior surfaces extending between first and second ends and forming a lower trough exhibiting a lower curve and having a lower edge, an upper trough exhibiting an upper curve and having an upper edge and a ridge exhibiting an intermediate curve and joining the lower and upper troughs. The first set of one or more tabs extend from the upper edge of the upper trough in a first direction and exhibit first, second and third curves.

The disclosure also describes a painting caddy. The painting caddy includes a tray and end cups. The tray has interior and exterior surfaces extending between first and second ends and forming a lower trough exhibiting a lower curve and having a lower edge, an upper trough exhibiting an upper curve and having an upper edge and a ridge exhibiting an intermediate curve and joining the lower and upper troughs. The end cups are configured for engaging first and second ends of the tray at the upper trough and have one or more vessel engagement appendages extending therefrom.

Further, the disclosure describes a method for manufacturing a painting caddy. The method includes providing a sheet of malleable material having first, second, third and fourth edges defining interior and exterior surfaces. The sheet is cut at the first edge to form first and second sets of at least one tab, the sheet is bent to produce lower and upper troughs separated by a ridge, the first set of at least one tab is bent to yield first, second and third curves and the second set of at least one tab is bent to yield first and second curves.

BRIEF DESCRIPTION OF THE FIGURES

The summary above, as well as the following detailed description of illustrative embodiments, is better understood when read in conjunction with the appended drawings. For the purpose of illustrating the present disclosure, example constructions of the disclosure are shown in the drawings. However, the present disclosure is not limited to specific methods and instrumentalities disclosed herein. Moreover, those in the art will understand that the drawings are not to scale. Wherever possible, like elements have been indicated by identical numbers.

Embodiments of the present disclosure will now be described, by way of example only, with reference to the following diagrams wherein.

DETAILED DESCRIPTION

Figure 1:
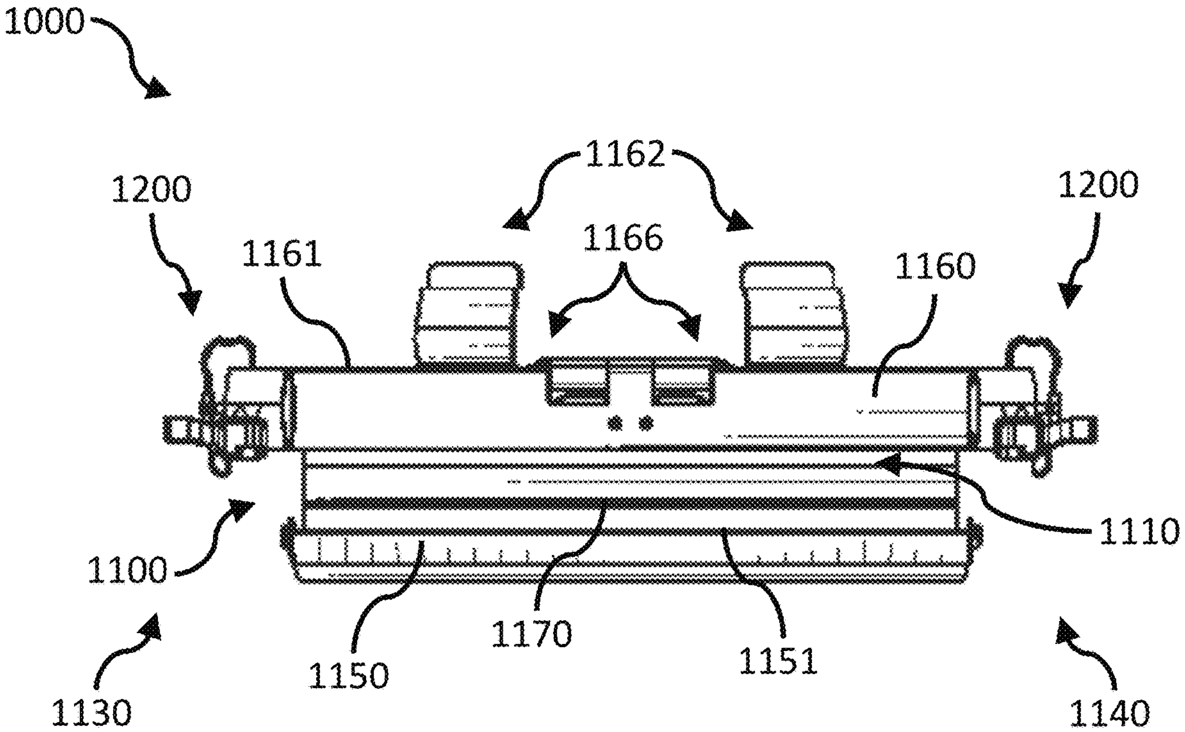
FIG. 1 illustrates a front view of an example painting caddy or organizer.
Figure 2:
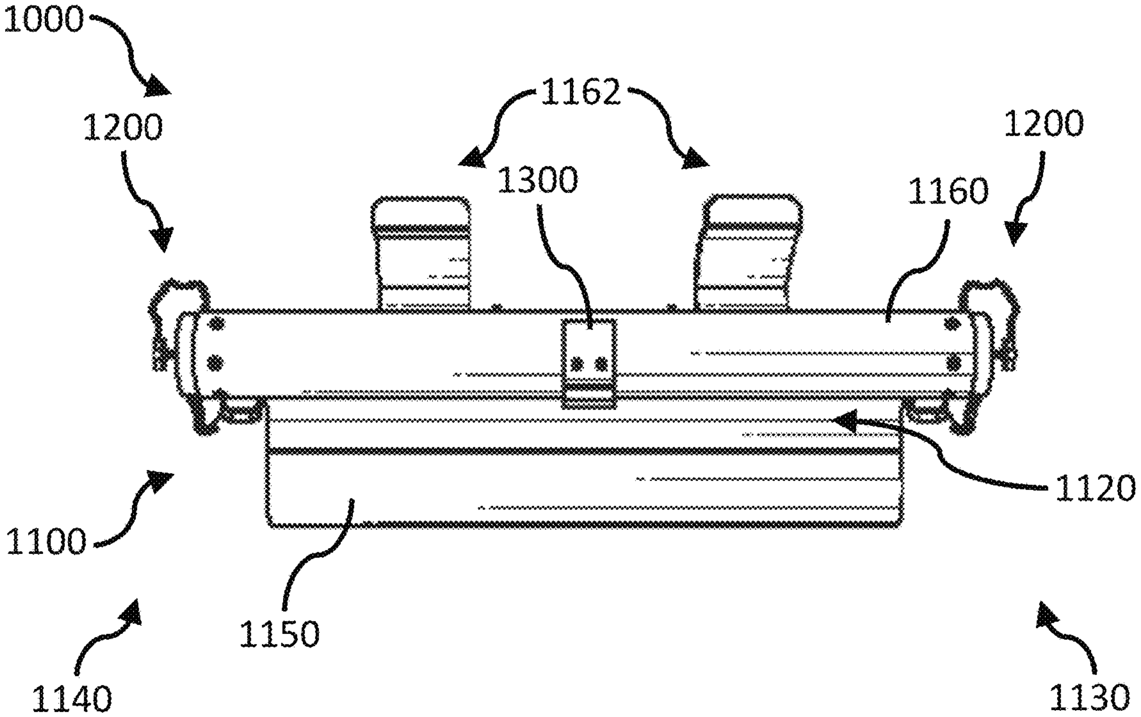
FIG. 2 illustrates a rear view of the example organizer of FIG. 1.
Figure 3:
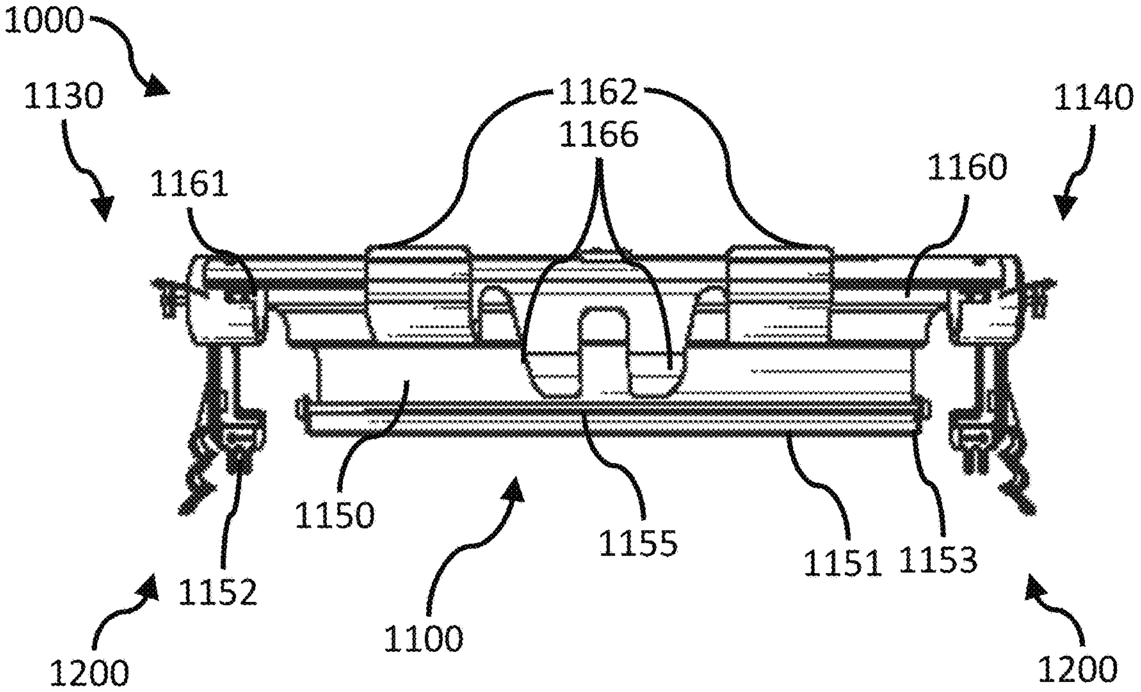
FIG. 3 illustrates a top view of the example organizer of FIGS. 1 & 2.
Figure 4:
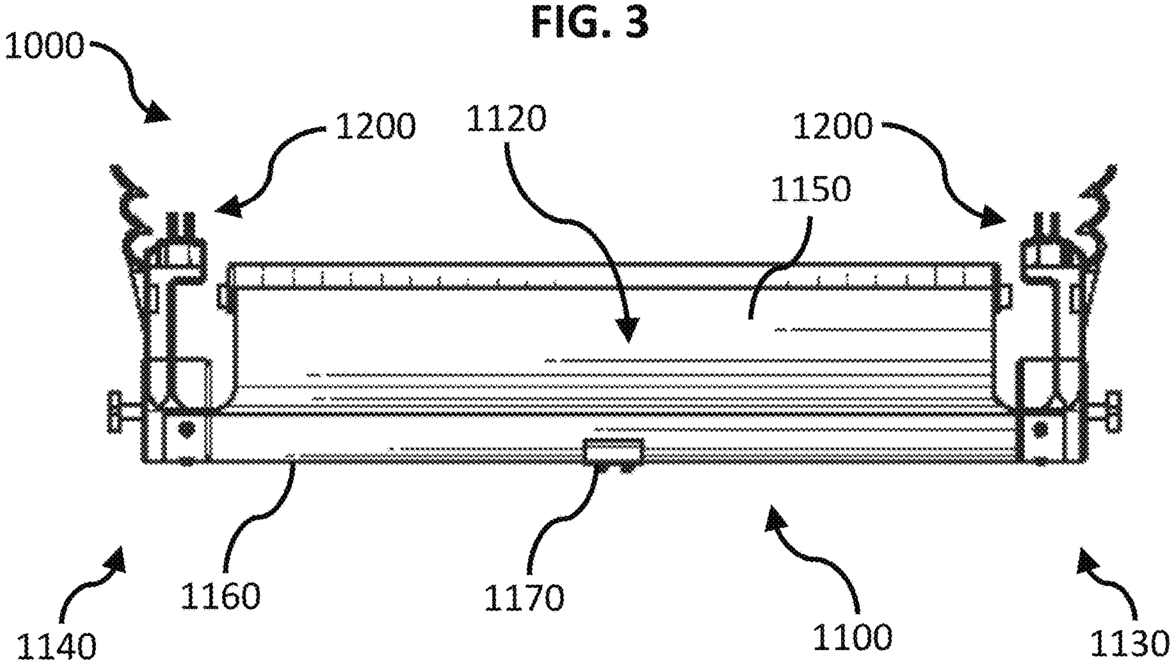
FIG. 4 illustrates a bottom view of the example organizer of FIGS. 1-3.

The following detailed description illustrates embodiments of the present disclosure and manners by which they can be implemented. Although the best mode of carrying out the present disclosure has been disclosed, those of ordinary skill in the art would recognize that other embodiments for carrying out or practicing the present disclosure are also possible.

It should be noted that the terms “first”, “second”, and the like, herein do not denote any order, quantity, or importance, but rather are used to distinguish one element from another. Further, the terms “a” and “an” herein do not denote a limitation of quantity, but rather denote the presence of at least one of the referenced item.

Presently, it is typical that a painter would precariously balance a painting roller on the edge of a paint bucket or other paint vessel or leave the roller partially submerged in paint in the bucket or a paint tray.

Embodiments of the disclosure provide a painting caddy or organizer which will provide more secure storage locations for painting applicators when still wet with paint but in between applications to the painted surface. Shortcomings of the prior art, are substantially eliminated, or at least partially addressed by embodiments of the disclosure, enabling improved workflow efficiency for users of paint applicators, implements or tools such as rollers and brushes.

Additional aspects, advantages, features and objects of the disclosure will be made apparent from the drawings and the detailed description of the illustrative embodiments construed in conjunction with the appended claims that follow. It will be appreciated that features of the disclosure are susceptible to being combined in various combinations without departing from the scope of the disclosure as defined by the appended claims.

FIGS. 1-5 illustrate an example painting caddy 1000 which may serve as an organizer for a variety of painting applicators and other tools. The organizer 1000 includes a tray 1100 and appendages 1200. The tray 1100 has interior 1110 and exterior 1120 surfaces extending between first 1130 and second 1140 ends and forming a lower trough 1150 exhibiting a lower curve and having a lower edge 1151 and an upper trough 1160 exhibiting an upper curve and having an upper edge 1161. A ridge 1170 exhibits an intermediate curve and joins lower and upper troughs 1150 and 1160. With lower and upper troughs 1150 and 1160, organizer 1000 is two-tiered.

Exterior surface 1120 of tray 1100 may be convex at both lower and upper troughs 1150 and 1160 and interior surface 1110 of tray 1100 may be concave at both lower and upper troughs 1150 and 1160. The center of the radius of curvature of upper trough 1160 may be located along a line approximately parallel with the line along which the center of the radius of curvature of lower trough 1150 is located. In other words, the longitudinal axes of lower and upper troughs 1150 and 1160 are approximately parallel. Lower edge 1151 and upper edge 1161 may be approximately parallel. In all such cases of parallelism, the objects in question will be sufficiently parallel that an ordinary observer would not discover otherwise without careful inspection. In an example, the curvature of upper and lower troughs 1160 and 1150 is consistent or constant between first and second ends 1130 and 1140 of tray 1100.

A first set of tabs 1162 extend from upper edge 1161 of upper trough 1160 in a first direction and exhibit, reveal or manifest first 1163, second 1164 and third 1165 curves. First curve 1163 of tabs of the first set 1162 may be continuous and/or contiguous with the upper curve. Third curve 1165 of tabs 1162 of the first set may be configured to cradle a roller frame while an attached roller is cradled by upper trough 1160. Second curve 1164 transitions tabs 1162 between first and third curves 1163 and 1165. In an equilibrium state, tabs 1162 of the first set press up/out on a cradled roller frame to wedge between a roller cradled by upper trough 1160 and the roller frame and to effectively grip the roller frame by preventing the frame from overcoming a crest of second curve 1165. Tabs 1162 of the first set may be configured to flex out of the equilibrium state to reduce or lower the crest of second curve 1165 to accommodate placement of the roller frame in as well as removal of the roller frame from third curve 1165 while the roller is received in the upper trough 1160. Tabs 1162 of the first set remember their equilibrium state and shape after elastic deformation. While, as shown in the figures as two in number, the number of tabs 1162 associated with the first set may be fewer than or greater than illustrated.

Organizer 1000 may further include, extending from upper edge 1161 of upper trough 1160 in a second direction generally opposite the first direction, a second set of one or more tabs 1166 exhibiting, revealing or manifesting first 1167 and second 1168 curves. First curve 1167 of tabs 1166 of the second set may also be continuous and/or contiguous with the upper curve and may be configured to wrap around and/or partially encircle a roller cradled by upper trough 1160. In an equilibrium state, tabs 1166 of the second set press in/down on a cradled roller to grip the roller by preventing the roller from overcoming a crest of second curve 1169. Tabs 1166 of the second set may be configured to flex out of the equilibrium state to reduce or lower the crest of second curve 1169 to accommodate placement of the roller in as well as removal of the roller from first curve 1167 and upper trough 1160. Tabs 1166 of the second set also remember their equilibrium state and shape after elastic deformation. While, as shown in the figures as two in number, the number of tabs 1166 associated with the second set may be fewer than or greater than illustrated.

Organizer 1000 may further include at least one tab central slot formed between tabs 1166 of the second set and several lateral tab slots formed between tabs 1162 of the first set and tabs 1166 of the second set.

Organizer 1000 may further include a roller frame support rod or rail 1155 provided between flanges 1152, 1153 at first and second ends 1130 and 1140 of tray 1100 in lower roller trough 1150. In an example, flanges 1152 and 1153 include fastener holes (not visible) through which rail 1155 may be coupled to flanges 1152 and 1153 by way of fasteners 1156.

Figure 6:
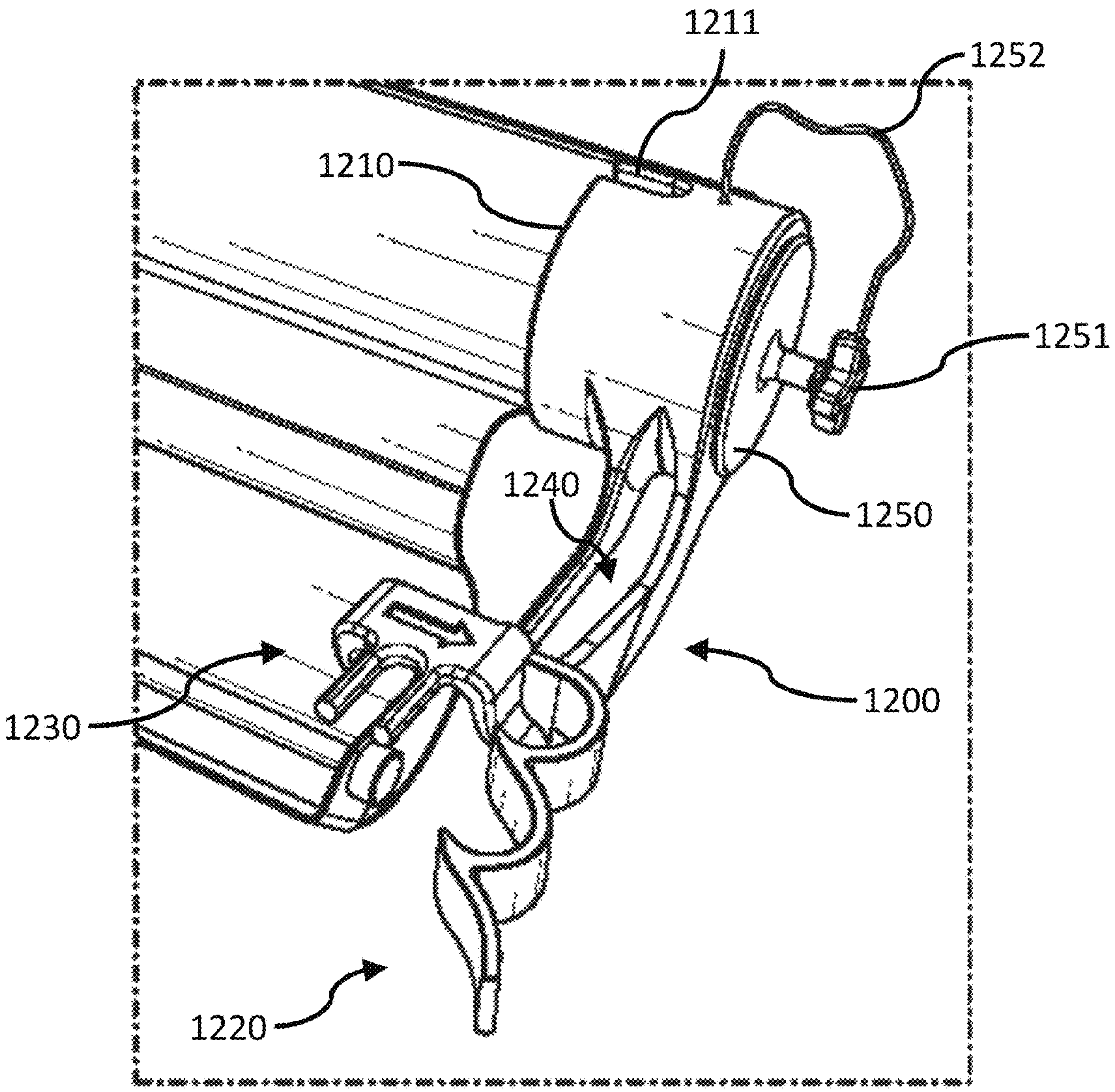
FIG. 6 illustrates a top detail view of components of the example painting caddy or organizer of FIGS. 1-5.
Figure 7:
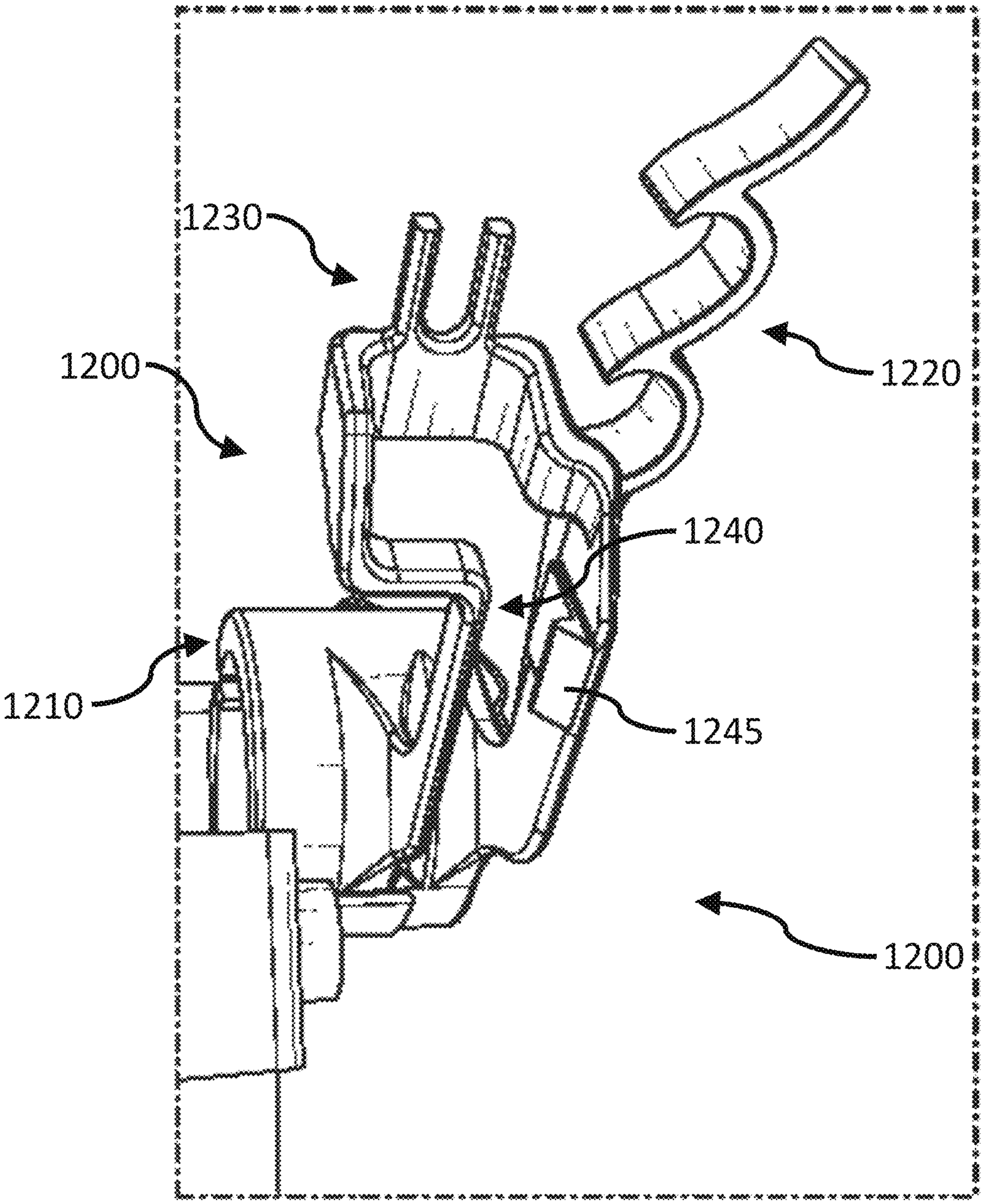
FIG. 7 illustrates a bottom detail view of components of the example organizer of FIGS. 1-5.

Referring to FIGS. 6 & 7, appendages 1200 include end cups 1210 configured to engage first and second ends 1130 and 1140 of tray 1100 at upper trough 1160 for example by insertion therein. One or more slots 1211 may be provided to a sidewall of each end cup 1210. Slots 1211 may be configured to receive or otherwise accept a portion of the frame of a 9" roller. A drain opening 1212 may be provided at a lateral end of each end cup 1210 such that when the end cups are provided to first and second ends 1130 and 1140 of tray 1100 at upper trough 1160 it is possible to access interior surface 1110 of tray 1100 along upper trough 1160 from either end. End caps 1250 may be provided to selectively close the drain openings. A knob 1251 provided to each end cap 1250 facilitates removal of the end caps from the drain openings of upper trough 1160. To prevent loss or misplacement of end caps 1250, leashes 1252 may be provided to tether each end cap 1250 to tray 1100 at upper trough 1160 near first and second ends 1130 and 1140.

Figure 5:
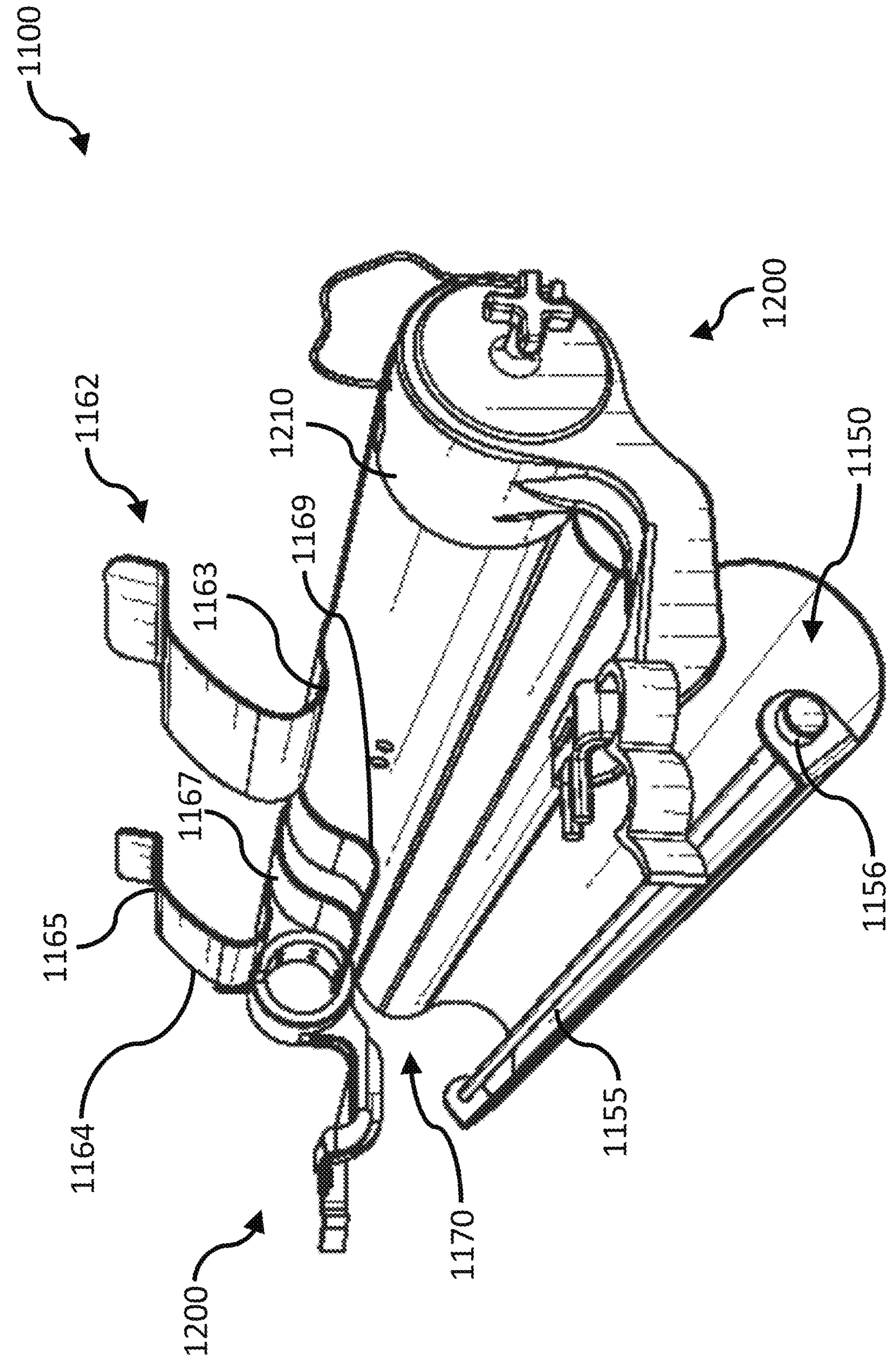
FIG. 5 illustrates a right front perspective view of the example organizer of FIGS. 1-4.

With end cups 1210 engaging first and second ends 1130 and 1140 of tray 1100 at upper trough 1160, vessel rails 1240 extend from each end cup 1210 in the same general direction as tabs 1166 of the second set. For example, the trajectory of rails 1240 may be such that distal ends of the rails are further from a cross-sectional center of an end cup 1210 than proximal ends of the rails are (FIGS. 5 & 6). A channel is formed between rails 1240 and a tab 1245 projects from one of the rails into the channel.

With end cups 1210 seated in upper trough 1160, vessel rails 1240 and thereby the associated channel may be provided near each of first and second ends 1130 and 1140 of tray 1100 near lower trough 1150. The channel is configured to engage or surround a rim of a paint vessel while tab 1245 snaps onto the rim to selectively lock appendages 1200, and thereby organizer 1000, to the rim. Organizer 1000 further comprising a fork 1230 provided to a distal end of vessel rails 1240 and configured to engage one or more painting applicators, accessories or related tools with one or more resilient tines. Indicia provided to a base of fork 1230 proximal of the tines may offer instruction to a user to flex appendages rails 1240 outward to disengage tab 1245 from the vessel rim.

Again, referring to FIGS. 6 & 7, organizer 1000 may further include a series of contiguous handle hooks 1220 extending from appendages 1200. In an example, hooks 1220 open inward such that hooks 1220 of a left side appendage 1200 open towards hooks 1220 of a right side appendage 1200 and such that sides of an upright vessel loop handle may be clipped in to hooks 1220.

Organizer 1000 may further include a plurality of fasteners 1260 configured for selective receipt through aligned pairs of upper trough fastener holes (not visible) and end cup fastener holes (not visible) to set relative positions of the end cups 1210 and upper roller trough 1160 to correspond with one of a variety of vessel types. For example, end cups 1210 may be extended from upper trough 1160 slightly and fastened in position to accommodate a vessel of a larger width.

Organizer 1000 may further include, mounted to tray exterior surface 1120 and configured to engage a rim of a paint vessel, a third set of one or more tabs 1300. One or more tabs 1300 of the third set may engage the rim of the paint vessel at a location where a line tangent to the rim as viewed from above is approximately perpendicular to the rails 1240. Each of the third set of one or more tabs 1300 may be formed with a flange 1310 on and a through-hole 1320 in one or more of tabs 1300 of the third set. One or more fasteners 1330 may be used to couple or mount tabs 1300 to exterior surface 1120 of upper trough 1160.

Figure 8:
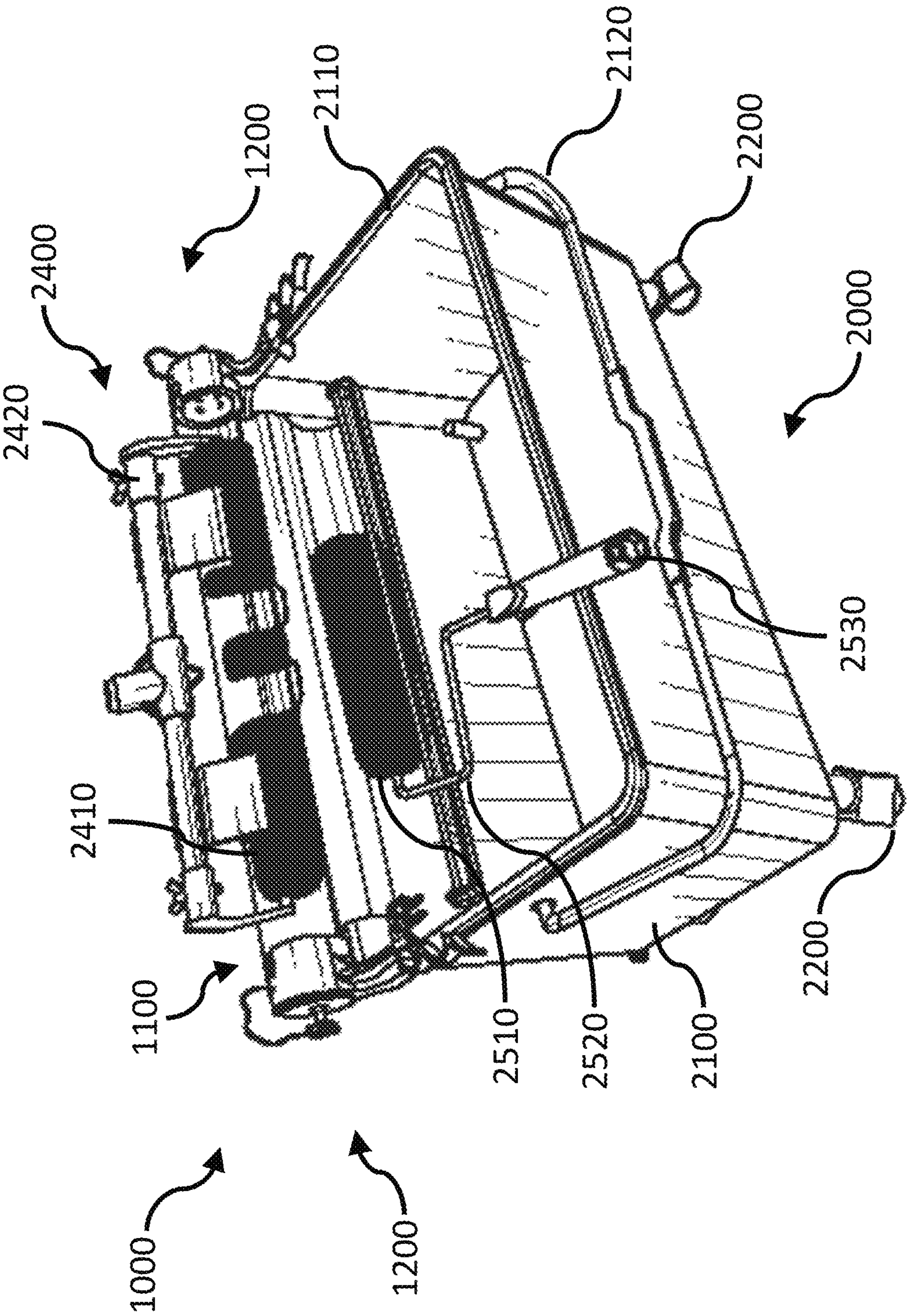
FIG. 8 illustrates a front perspective view of the example painting caddy or organizer of FIGS. 1-5 provided to the top of a painting vessel.
Figure 9:
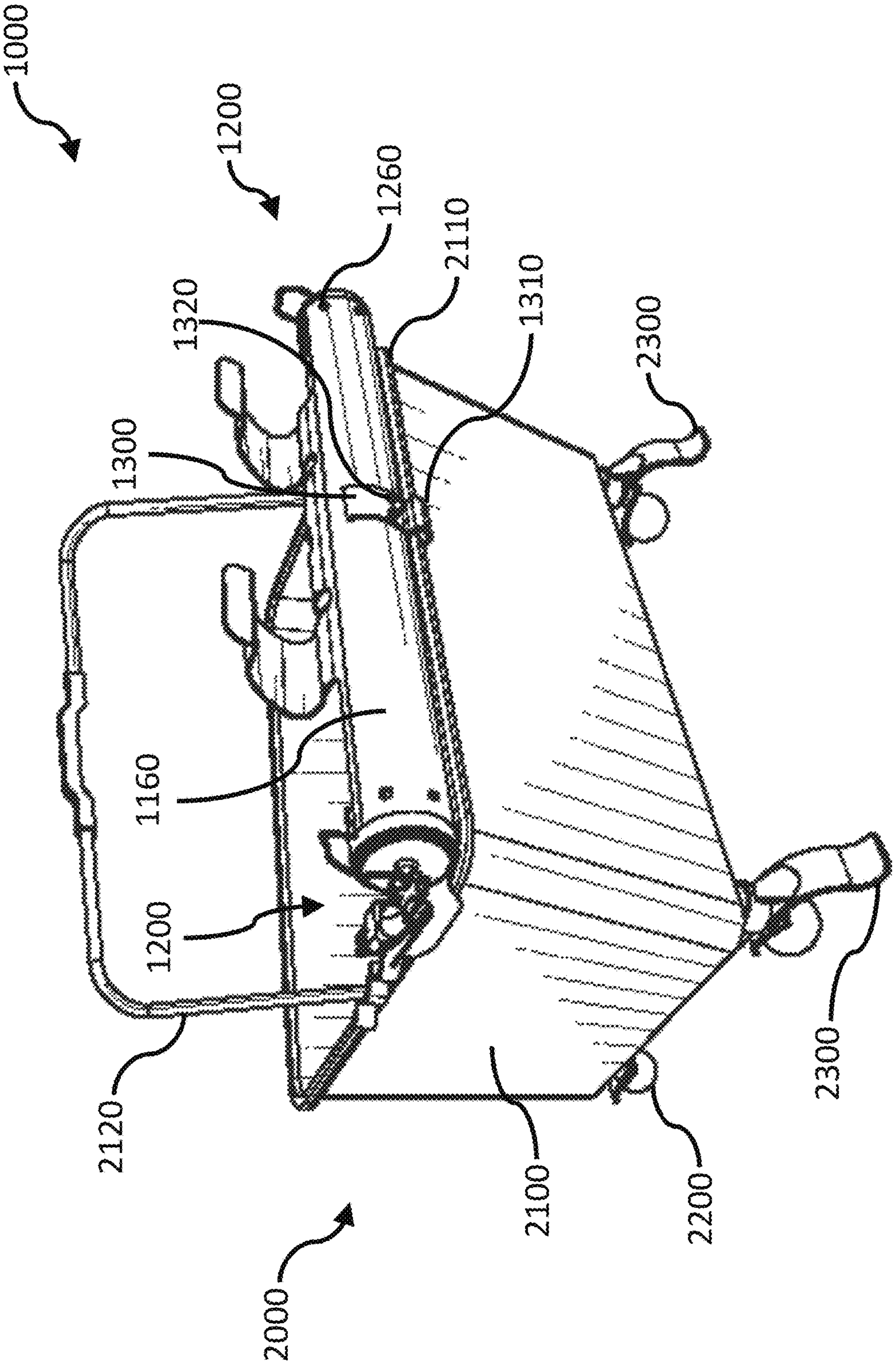
FIG. 9 illustrates a rear perspective view of the example painting caddy or organizer of FIGS. 1-5 provided to the top of a painting vessel.

Referring to FIGS. 8 & 9, in an example, organizer 1000 is provided, such as in a kit, with a number of castors 2200 suitable for mounting to a vessel 2000 to enable to vessel 2000 to be easily rolled along a support surface as the user moves around a worksite. In a further example, organizer 1000 is provided, such as in a kit, with a number of kickstands 2300 suitable for mounting to vessel 2000 or to castors 2200 to prevent tipping of vessel 2000 in the event the wheels lock up and a pushing force yields a moment on vessel 2000 about a horizontal axis. Kickstands 2300 may be suitable to limit the angle to which vessel 2000 is able to tilt.

Disclosed painting caddies and/or organizers for paint applicators may be manufactured in accordance with any of a variety of methods. An example method for manufacturing includes providing a sheet of material having first, second, third and fourth edges defining interior and exterior surfaces and cutting or trimming the sheet at the first edge to form first and second sets of at least one tab. The sheet may be provided as any of a variety of malleable materials which will also maintain a desired shape including but not limited to metals. For example, the sheet may be provided as a steel sheet. The sheet may be provided in any of a variety of thicknesses suitable to enable shaping of the sheet into a tray having various curves. In an example, the sheet is provided with a thickness of between 18 and 24 gauge or between about 0.5 mm and 1.0 mm. In a further example, the sheet may be provided as 22-gauge steel.

Cutting or trimming the sheet at the first edge to form first and second sets of at least one tab may also result in the formation of a number of lateral tab slots between the tabs of the first set and the tabs of the second set and at least one tab central slot between the tabs of the second set.

The sheet is bent to produce lower and upper troughs separated by a ridge, the first set of at least one tab is bent to yield first, second and third curves and the second set of at least one tab is bent to yield first and second curves. The sheet may be bent such that the exterior surface of the tray is convex at both the lower and upper troughs and the interior surface of the tray is concave at both the lower and upper troughs.

The first set of at least one tab may be bent such that at least one tab extends in a first direction and such that the first curve is continuous with a curvature of the upper trough. The second set of at least one tab may be bent such that at least one tab extends in a second direction generally opposite the first direction and such that the first curve is continuous with a curvature of the upper trough.

Further, the sheet may be cut to form flanges at the first and second ends of the tray in the lower roller trough and theses flanges may be bent to an angle with a longitudinal axis of the lower trough. A support rod or rail may be coupled between the flanges, for example, with two or more fasteners.

The method may further include forming a third set of one or more tabs configured for mounting to the upper trough exterior surface and for engaging the rim of the paint vessel. The third set of one or more tabs may be formed with a flange to engage the rim. One or more fasteners are inserted through holes in one or more of the tabs of the third set which have been aligned with holes provided in the exterior surface of the tray at the upper trough so that the tabs are coupled with the tray.

The method may further include forming first and second appendages configured for coupling in the upper trough at the respective first and second ends of the tray. The first and second appendages may be formed from any of a variety of materials suitable for molding, extruding and/or pressing into a desired form including various plastics, rubbers and combinations thereof. Suitable materials offer flexibility, resilience and elasticity for enhancing engagement with a user's painting tools. In an example, the appendages are formed from high-density polyethylene.

The first and second appendages may be formed with rails surrounding at least one channel configured to engage or surround a rim of a paint vessel. The first and second appendages may each be formed with an end cup and at least one slot and a drain opening created in each end cup. The method may further include forming end caps configured to close the drain openings and each including at least one knob. A leash may be threaded through an opening in each of the end caps and the tray so that the end caps may be tethered the to the upper trough to prevent misplacement.

The first and second appendages may further be formed with a fork distal from the end cups and a series of contiguous vessel handle hooks extending from the end cups.

The method may further include selectively inserting a plurality of fasteners through aligned pairs of the upper roller tray fastener holes and end cup fastener holes to set relative positions of the end cups and upper roller tray to correspond with one of a variety of vessel types.

Disclosed painting caddies and organizers for painting applicators may be suitable for mounting to a vessel in accordance with any of a variety of methods. Referring to FIGS. 8 & 9, in an example method, an open-top vessel 2000 having a body 2100 and a perimeter rim 2110 is provided and an organizer is placed on the vessel. The painting organizer is placed such that disjoint channels surround and/or grip the perimeter rim 2110 at first and second distal locations thereof and a tab engages the rim at another location distal from the first and second locations. As such, upper and lower semi-cylindrical troughs of the caddy extend generally between the first and second distal locations of the perimeter rim.

Disclosed painting caddies and/or organizers for paint applicators may be suitable for use in any of a variety of methods for organizing paint applicators, accessories and/or other related tools. Again, referring to FIGS. 8 & 9, in an example method an open-top vessel 2000 having a body 2100 and a perimeter rim 2110 is provided and the painting organizer is placed on the vessel such that disjoint channels surround and/or grip the perimeter rim at first and second distal locations thereof. A tab engages the rim at another location distal from the first and second locations and upper and lower semi-cylindrical troughs of the organizer extend, generally, between the first and second distal locations of the perimeter rim. Paint may be provided to the vessel before or after placement of the organizer on the vessel.

A painting roller 2400 is pressed into the upper semi-cylindrical trough such that one or more tabs projecting from the upper trough resiliently hold the roller cover 2410 and/or painting roller 2400 thereto. A handle 2430 and frame 2420 to which the roller cover 2410 is mounted are rotated until the frame 2420 engages one or more additional tabs extending from the upper semi-cylindrical trough and snaps into place. The additional tabs resiliently fix the frame relative to the upper semi-cylindrical trough holding the roller, including roller cover and roller frame, still.

A second painting roller 2500 including roller cover 2510 may be placed in the lower semi-cylindrical trough, for example, with portions of a roller frame 2520 and/or handle 2530 supported or partially supported by a rail provided along the lower trough generally between first and second ends of the tray. The lower roller trough and rail are configured to hold the roller, including the roller cover and roller frame, still. A handle 2120 of the vessel may be held in an upright position by rotating the same until it is gripped by one or more of a series of resilient hooks extending from the first and second ends of the tray at which point the handle 2120 may snap into place.

Embodiments of the disclosure are susceptible to being used for various purposes, including, though not limited to, enabling users to more easily and effectively store and secure paint applicators, implements or tools to thereby enable improved workflow efficiency. Such tools include but are not limited to rollers and/or roller covers of a variety of lengths between 3 and 18 in.

Modifications to embodiments of the disclosure described in the foregoing are possible without departing from the scope of the disclosure as defined by the accompanying claims. Expressions such as “including”, “comprising”, “incorporating”, “consisting of”, “have”, “is” used to describe and claim the disclosure are intended to be construed in a non-exclusive manner, namely allowing for items, components or elements not explicitly described also to be present. Reference to the singular is also to be construed to relate to the plural.

What is claimed is:

1. An organizer for paint applicators, comprising:

a tray having interior and exterior surfaces extending between first and second ends and forming a lower trough exhibiting a lower curve and having a lower edge, an upper trough exhibiting an upper curve and having an upper edge and a ridge exhibiting an intermediate curve and joining the lower and upper troughs;

extending from the upper edge of the upper trough in a first direction, a first set of one or more tabs exhibiting first, second and third curves; and provided to first and second ends of the tray at the upper trough and extendable relative thereto, end cups each having one or more vessel engagement appendages extending therefrom.

2. The organizer as set forth in claim 1, further comprising, extending from the upper edge of the upper tray in a second direction generally opposite the first direction, a second set of one or more tabs exhibiting first and second curves wherein the second set of one or more tabs are configured to grip a roller cradled in the upper trough.

3. The organizer as set forth in claim 2, further comprising mounted to the tray exterior surface and configured to engage a rim of a paint vessel, a third set of one or more tabs.

4. The organizer as set forth in claim 1, wherein the third curve of the tabs of the first set is configured to cradle a roller frame while an attached roller is cradled by the upper trough.

5. The organizer as set forth in claim 1, further comprising at least one channel provided near each of the tray first and second ends and configured to surround a rim of a paint vessel.

6. The organizer as set forth in claim 1, further comprising at least one vessel rim engagement channel provided in the engagement appendages.

7. The organizer as set forth in claim 1, further comprising a series of contiguous vessel handle hooks extending from the vessel engagement appendages.

8. The organizer as set forth in claim 1, wherein the exterior surface of the tray is convex at both the lower and upper troughs and the interior surface of the tray is concave at both the lower and upper troughs.

9. A painting caddy, comprising:

a tray having interior and exterior surfaces extending between first and second ends and forming a lower trough exhibiting a lower curve and having a lower edge, an upper trough exhibiting an upper curve and having an upper edge and a ridge exhibiting an intermediate curve and joining the lower and upper troughs;

extending from the upper edge of the upper trough in a first direction, a first set of one or more tabs exhibiting first, second and third curves;

configured for engaging first and second ends of the tray at the upper trough, end cups having one or more vessel engagement appendages extending therefrom;

at least one vessel rim engagement channel provided in the engagement appendages; and a series of contiguous vessel handle hooks extending from the vessel engagement appendages.

10. The painting caddy as set forth in claim 9, further comprising a vessel rim tab mounted to the exterior surface of the tray at the upper trough.

* * * * *